No. 703,891. Patented July 1, 1902.
J. B. BROOKS & J. HOLT.
CYCLE SADDLE ATTACHMENT.
(Application filed Feb. 15, 1902.)
(No Model.) 3 Sheets—Sheet 1.
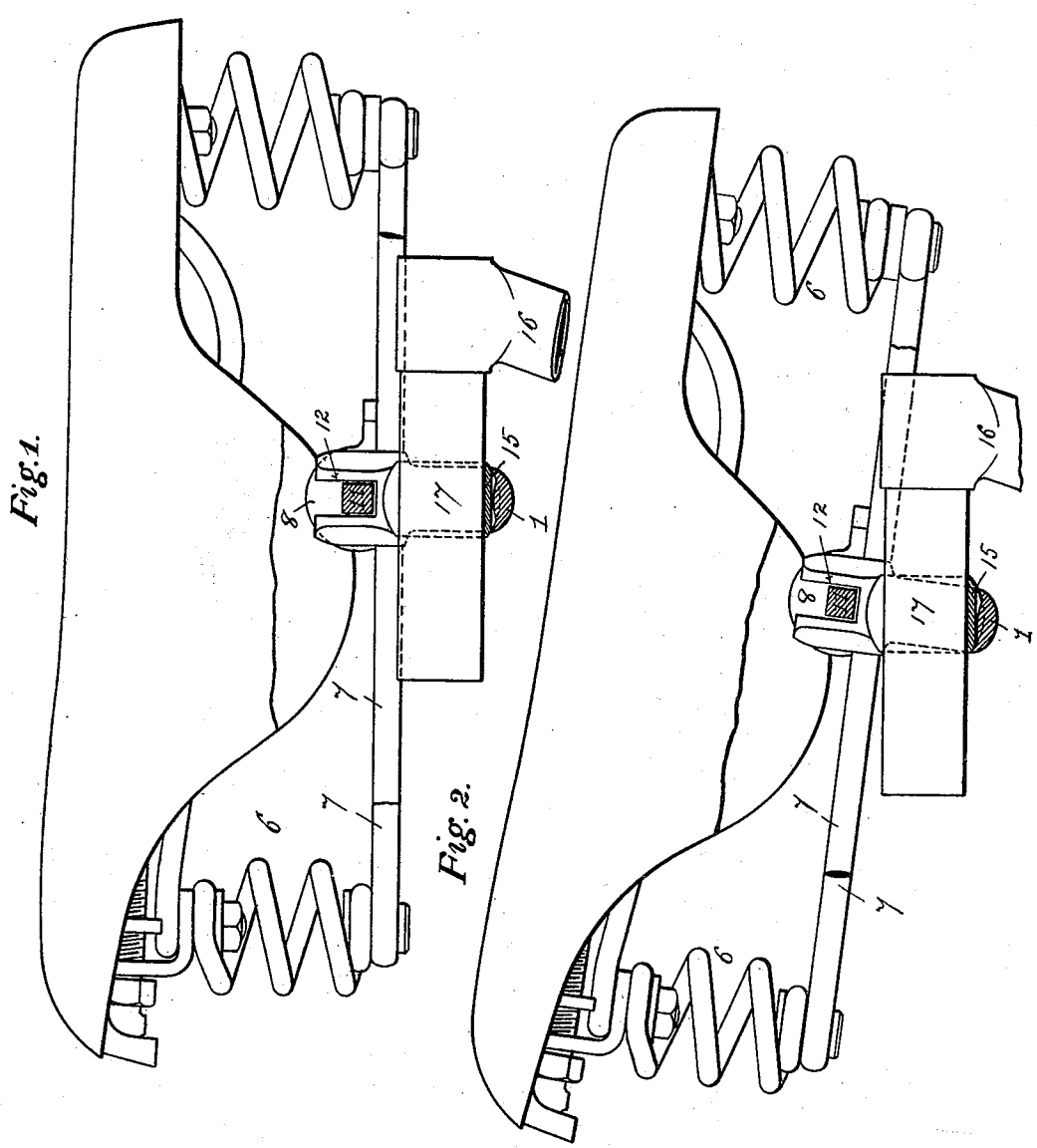
WITNESSES
INVENTORS
John B. Brooks
John Holt
BY James L. Norris
ATTY No. 703,891. Patented July 1, 1902.
J. B. BROOKS & J. HOLT.
CYCLE SADDLE ATTACHMENT.
(Application filed Feb 15, 1902.)
(No Model.) 3 Sheets—Sheet 2.
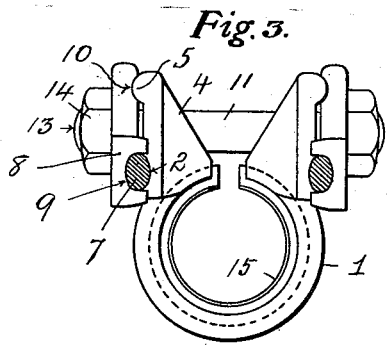
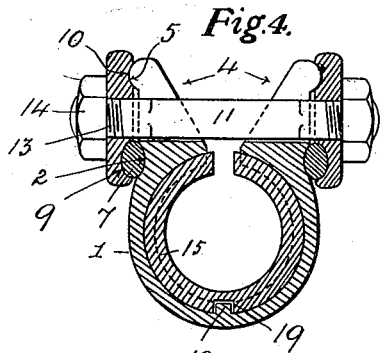
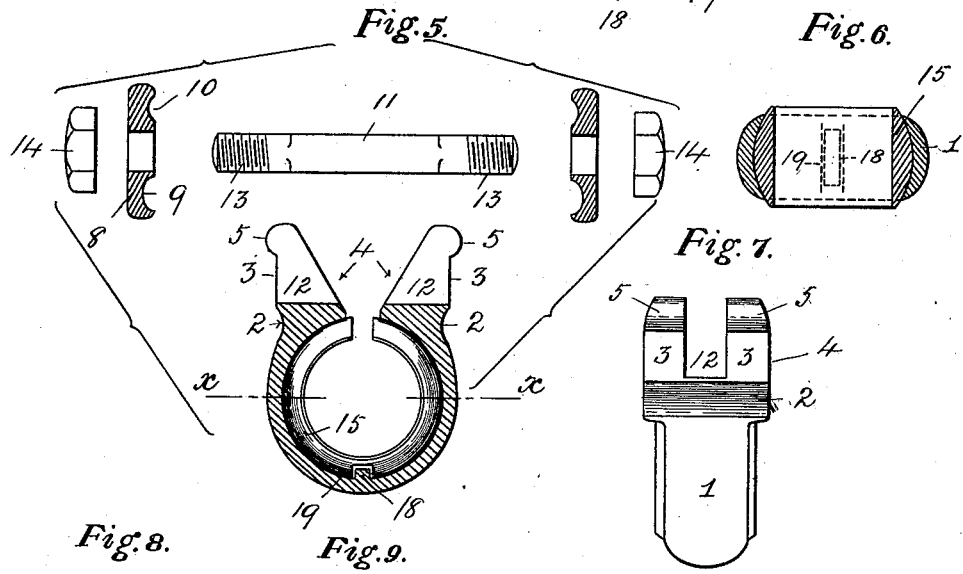
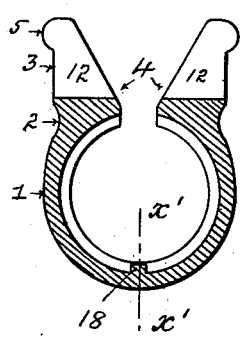
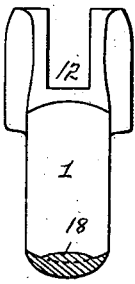
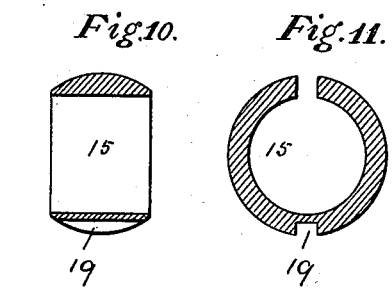
WITNESSES
INVENTORS John B. Brooks
John Holt
BY James L. Norris
ATTY No. 703,891. Patented July 1, 1902.
J. B. BROOKS & J. HOLT.
CYCLE SADDLE ATTACHMENT.
(Application filed Feb. 15, 1902.)

(No Model.) 3 Sheets—Sheet 3.

WITNESSES
INVENTORS John B. Brooks
John Holt
BY James L. Norris
ATTY

UNITED STATES PATENT OFFICE.

JOHN BOULTBEE BROOKS AND JOHN HOLT, OF BIRMINGHAM, ENGLAND.

CYCLE SADDLE ATTACHMENT.

SPECIFICATION forming part of Letters Patent No. 703,891, dated July 1, 1902.

Application filed February 15, 1902. Serial No. 94,255. (No model.)

*To all whom it may concern:*

Be it known that we, JOHN BOULTBEE BROOKS, managing director, and JOHN HOLT, works manager, subjects of the King of Great Britain, residing at Criterion Works, Great Charles street, Birmingham, England, have invented certain new and useful Improvements in Cycle Saddle Attachments, of which the following is a specification.

This invention has relation to attachment bosses or clips for adjustably securing cycle-saddles to their supports, and has for its object to provide a simple, yet efficient, form of attachment which is capable of ready adjustment for setting the saddle at the desired angle or degree of tilt relative to its support and of firmly gripping the said support when tightened.

Figure 12:
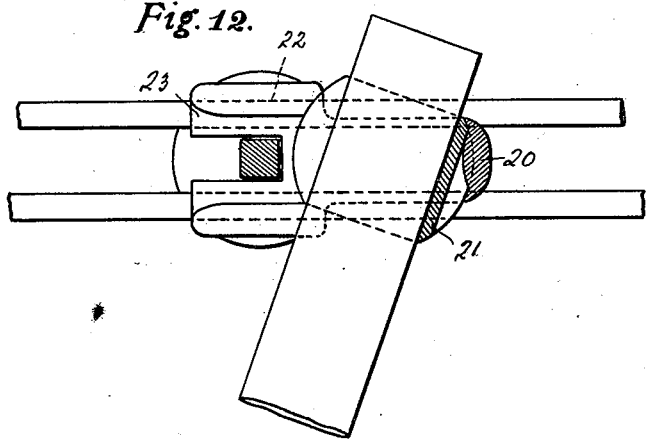
Figure 13:
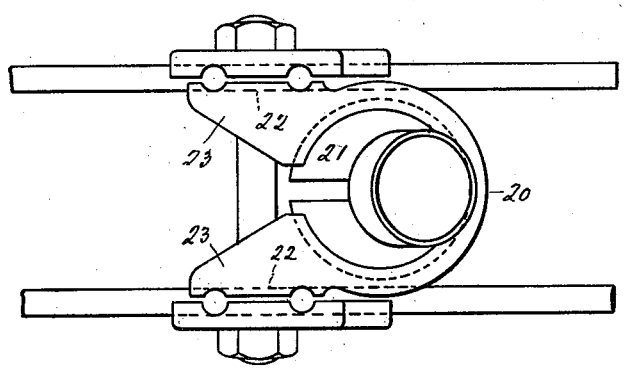
Figure 14:
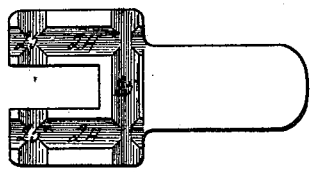

Figure 1 of the accompanying drawings shows a cycle-saddle secured to its supporting-pillar by a clip constructed according to this invention, the said clip being shown in longitudinal vertical section. Fig. 2 is a similar view to Fig. 1, but shows the saddle tilted to a considerable angle and there secured by means of the attachment clip. Fig. 3 represents, upon an enlarged scale, an end elevation of the clip separately. Fig. 4 is a transverse vertical section of the said clip, and Fig. 5 shows the several component parts of the clip separated and partly in section and partly in elevation. Fig. 6 is a horizontal section of the body part of the clip and its adjustable lining upon the dotted line $x$. Fig. 7 is a side elevation of the said clip body and lining. Fig. 8 shows the said clip-body part separately and in transverse vertical section, while Fig. 9 is a longitudinal vertical section thereof upon the dotted line $x'$. Figs. 10 and 11 show two different sectional views of the adjustable lining separately. Fig. 12 represents, partly in elevation and partly in longitudinal section, a modified form of adjustable clip suitable for application to the summit of a direct seat-pillar. Fig. 13 is another view showing the attachment in plan, and Fig. 14 is a detail view hereinafter more particularly described.

The same numerals of reference indicate corresponding parts in the several figures of the drawings.

In the form of our invention represented in the drawings the body part of the attachment consists of a U-shaped clip 1, having longitudinal grooves 2, directed across the outer faces or cheeks 3 of the end parts 4, and ribs or projections 5, running parallel with the said grooves, which are adapted to receive the side members 7 of the saddle-frame 6, the said members being gripped between the said grooves of the cheeks and corresponding grooves 9 on the inner sides of gripping-washers 8, which also have grooves at 10, adapted to engage over the longitudinal ribs 5 of the cheeks. The gripping-washers are strung upon the ends of a square-sectioned cross pin or bolt 11, lying or seated within corresponding open gaps 12, cut in the ends of the clip, and provided at its opposite screwed extremities 13 with nuts 14, the screwing up of which clamps the washers against the cheeks of the clip, with the frame-wires gripped between the opposed grooved surfaces, and at the same time the clip is contracted circumferentially for securing the saddle in its adjusted position to the support, as hereinafter described. This method of connecting the cross-pin to the clip-body greatly facilitates the assemblage and attachment of the various component parts; but we wish it, however, to be clearly understood that we do not confine ourselves to any particular means for contracting the clip-body or securing the saddle by means of its framing to the clip, as any other well-known devices may be used for these purposes without departing from the nature of our invention. The internal circumference of the clip is made concaved in form, as shown in the sectional view Fig. 6, the curvature of the concavity being that of a radius struck from the center of the eye of the clip or from the center of the seat-support on which the clip is fitted, so that interiorly the clip is in the form of a part-spheroidal socket, which is fitted with a loose split sleeve or lining 15, adapted to take onto the horizontal arm 17 of the seat-support 16, so as to be relatively stationary thereto, while on its outer circumference the said sleeve is made spheroidal or in the form of a segment of a sphere having the same diameter as the spherical socket formed by the inside of the clip, so that the said clip (which is fixed to the saddle) is capable of an angular adjustment upon the split lining or sleeve (which is relatively stationary to the seat-pillar) in a manner similar to that obtainable between the elements of a ball-and-socket joint, and after adjustment the two parts may be secured in their adjusted positions by screwing up the clamping-pin of the clip, which in addition to tightening up the saddle-frame-gripping devices also contracts the body or outer socket-like part of the clip around the spheroidal inner part or lining, and this latter in turn is closed around and made to firmly grip the seat-support, and thus the rigid connection of the saddle to its support is effected. The interior of the socket part may be provided at a point in a vertical line below the longitudinal axis of the clip with a straight rib or feather 18, engaging with a corresponding groove or channel 19 in the spheroidal lining, which prevents any relative movement between the two elements other than in the direction required.

20 is the socket-body part of the clip, and 21 the spheroidal lining, which is disposed horizontally to take onto the summit of the seat-pillar, and the one part is angularly adjustable relative to the other part in the same manner as hereinbefore described in connection with the clip shown in Figs. 1 to 10. In this arrangement, however, the keep-grooves 22 for the frame-wires are directed longitudinally along the opposite faces of the clip-cheeks 23 instead of transversely, as in the previous form, and the gripping-washers on the ends of the cross-pin are correspondingly grooved.

Where the attachment is desired to be interchangeably applicable to straight seat-pillars or to seat-pillars having horizontal arms, then the cheeks of the clip may have double sets of keep-grooves 24 25, arranged as shown in Fig. 14, and the saddle-frame wires are placed in one set of grooves or the other, according to the manner in which the clip is applied.

Having fully described our invention, what we desire to claim and secure by Letters Patent is—

1. In a cycle saddle attachment, the combination of a clip or body portion, a split sleeve or lining for said body portion, said body portion being angularly adjustable on said sleeve, means for contracting said body portion and sleeve, and means for connecting a cycle-saddle to said body portion.

2. In a cycle saddle attachment the combination of a clip or body portion, a split sleeve or lining for said body portion, said body portion being angularly adjustable on said sleeve or lining, means for preventing lateral movement of said body portion on said sleeve, means for contracting said body portion and sleeve, and means for attaching a cycle-saddle to said body portion.

3. In a cycle saddle attachment, the combination of a clip or body portion, a sleeve or lining for said body portion, on which said body portion is angularly adjustable, the exterior of said sleeve being round or concaved, and the interior of said body portion being hollowed or convexed to fit said sleeve, means for preventing lateral displacement of said body portion on said sleeve, and means for attaching a cycle-saddle to said body portion.

In testimony whereof we have hereunto set our hands in presence of two subscribing witnesses.

JOHN BOULTBEE BROOKS.
JOHN HOLT.

Witnesses:
HY. SKERRETT,
ARTHUR T. SADLER.